*(12)* United States Patent
Giziewicz et al.

*(10)* Patent No.: US 10,031,299 B2
*(45)* Date of Patent: Jul. 24, 2018

(54) SILICON-BASED OPTICAL PORTS PROVIDING PASSIVE ALIGNMENT CONNECTIVITY

(71) Applicant: Corning Optical Communications LLC, Hickory, NC (US)

(72) Inventors: Wojciech Piotr Giziewicz, Berlin (DE); James Phillip Luther, Hickory, NC (US); Andreas Matiss, Berlin (DE); Jerald Lee Overcash, China Grove, NC (US)

(73) Assignee: Corning Optical Communications LLC, Hickory, NC (US)

( * ) Notice: Subject to any disclaimer, the term of this patent is extended or adjusted under 35 U.S.C. 154(b) by 73 days.

(21) Appl. No.: 15/167,137

(22) Filed: May 27, 2016

(65) Prior Publication Data

US 2017/0343747 A1    Nov. 30, 2017

(51) Int. Cl.
*G02B 6/42* (2006.01)
*G02B 6/30* (2006.01)

(52) U.S. Cl.
CPC ............ *G02B 6/423* (2013.01); *G02B 6/30* (2013.01); *G02B 6/428* (2013.01); *G02B 6/4232* (2013.01); *G02B 6/4284* (2013.01); *G02B 6/4292* (2013.01)

(58) Field of Classification Search
CPC ............ G02B 6/42; G02B 6/30; G02B 6/423
USPC .......................................................... 385/92
See application file for complete search history.

(56) References Cited

U.S. PATENT DOCUMENTS

| 6,095,697 | A | 8/2000 | Lehman et al. |
|---|---|---|---|
| 2002/0084565 | A1 | 7/2002 | Dautartas et al. |
| 2003/0012508 | A1 | 1/2003 | Westmarland et al. |
| 2003/0034438 | A1* | 2/2003 | Sherrer ............... G02B 6/4274 250/216 |
| 2006/0007972 | A1 | 1/2006 | Ericson et al. |

(Continued)

OTHER PUBLICATIONS

Barkai,A. Liu, D. Kim, R. Cohen, N. Elek, H. Chang, B. H. Malik, R. Gabay, R. Jones, M. Paniccia, and N. Izhaky, "Efficient Mode Converter for Coupling Between Fiber and Micrometer Size Silicon Waveguides," Group IV Photonics, 4th IEEE International Conference, Sep. 19-21, 2007, 49-51 2007.

(Continued)

*Primary Examiner* — Kaveh C Kianni
(74) *Attorney, Agent, or Firm* — Robert L. Branham

(57) ABSTRACT

Optical ports providing passive alignment connectivity are disclosed. In one embodiment, an optical port includes a substrate having a surface, a photonic silicon chip, a connector body, and a plurality of spacer elements. The photonic silicon chip includes an electrical coupling surface, an upper surface and an optical coupling surface. The optical coupling surface is positioned between the electrical coupling surface and the upper surface. The photonic silicon chip further includes at least one waveguide terminating at the optical coupling surface, and a chip engagement feature disposed on the upper surface. The connector body includes a first alignment feature, a second alignment feature, a mounting surface, and a connector engagement feature at the mounting surface. The connector engagement feature mates with the chip engagement feature. The plurality of spacer elements is disposed between the electrical coupling surface of the photonic silicon chip and the surface of the substrate.

13 Claims, 13 Drawing Sheets

(56) References Cited

U.S. PATENT DOCUMENTS

| | | | | |
|---|---|---|---|---|
| 2009/0154884 A1* | 6/2009 | Chen | ......................... | G02B 6/32 |
| | | | | 385/79 |
| 2014/0029894 A1 | 1/2014 | Bowen | | |
| 2014/0161385 A1* | 6/2014 | Lessard | .................. | G02B 6/122 |
| | | | | 385/14 |
| 2014/0185986 A1* | 7/2014 | Costello, III | ............ | G02B 6/32 |
| | | | | 385/33 |
| 2015/0036984 A1* | 2/2015 | Wang | ................... | G02B 6/4214 |
| | | | | 385/89 |
| 2015/0370015 A1* | 12/2015 | Aoki | .................... | G02B 6/4204 |
| | | | | 385/14 |
| 2016/0147024 A1* | 5/2016 | Lewallen | ............. | G02B 6/4249 |
| | | | | 385/14 |

OTHER PUBLICATIONS

T. Barwicz, et al., "Assembly of Mechanically Compliant Interfaces Between Optical Fibers and Nanophotonic Chips", Proc. IEEE Electron. Compon. Technol. Conf., 2014, pp. 179-185.

* cited by examiner

SILICON-BASED OPTICAL PORTS PROVIDING PASSIVE ALIGNMENT CONNECTIVITY

BACKGROUND

The present disclosure generally relates to high-bandwidth optical communication and, more particularly, to silicon-based optical ports enabling passive alignment connectivity for use in high-bandwidth optical communication systems.

Benefits of optical fiber include extremely wide bandwidth and low noise operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections. Accordingly, optical connectors are employed in both optical cable assemblies and electronic devices to provide an optical-to-optical connection wherein optical signals are passed between an optical cable assembly and an electronic device.

As the bandwidth of optical transceiver devices increases by advanced techniques such as silicon-based laser systems and wavelength division multiplexing, large amounts of data must be electronically transferred from the active devices and associated electronics to electronic components of the computing device (e.g., a data switching device of a data center) for further processing (e.g., up to 100 Gbps per channel). Further, the size of optical transceiver devices (e.g., laser diodes, photodiodes) continues to decrease, which presents challenges in maintaining proper alignment between the transceiver device and the optical connector to which it is connected.

In silicon-based laser devices, such as hybrid-silicon lasers and Raman lasers, optical signals are propagated through the device within silicon waveguides. In some silicon-based laser devices, the laser signals exit the device through a side facet such that the laser signal does not turn prior to being emitted. Currently, the alignment of the waveguides at the side facet to a mated optical connector requires an expensive and time consuming active alignment process (e.g., a vision-based active alignment process). Such active alignment processes add significant costs, and severely reduces throughput.

Accordingly, alternative optical ports that do not require active alignment systems to mate with a mated optical connector are desired.

SUMMARY

Embodiments are directed to optical ports that utilize passive alignment, as opposed to expensive active alignment, to align and mate a mated optical connector with the optical port. Particularly, embodiments described herein establish vertical reference datums, and provide mechanical features that provide horizontal axis control to establish an x- and y-axes position of the waveguides of a photonic silicon chip with respect to alignment features of a connector body of the optical port. The alignment features of the optical port are mated with corresponding alignment features of the mated optical connector to align the waveguides of the photonic silicon chip with corresponding optical components of the mated optical connector.

In this regard, in one embodiment, an optical port includes a substrate having a surface, a photonic silicon chip, a connector body, and a plurality of spacer elements. The photonic silicon chip includes an electrical coupling surface, an upper surface and an optical coupling surface. The optical coupling surface is positioned between the electrical coupling surface and the upper surface. The photonic silicon chip further includes at least one waveguide terminating at the optical coupling surface, and a chip engagement feature disposed on the upper surface. The connector body is secured to the substrate, and includes a first alignment feature, a second alignment feature, a mounting surface, and a connector engagement feature at the mounting surface. The connector engagement feature mates with the chip engagement feature of the photonic silicon chip. The plurality of spacer elements is disposed between the electrical coupling surface of the photonic silicon chip and the surface of the substrate.

In another embodiment, an optical port includes a substrate having a surface, a photonic silicon chip secured to the substrate, and a connector body secured to the substrate. The photonic silicon chip includes an electrical coupling surface, an upper surface and an optical coupling surface, wherein the optical coupling surface is positioned between the electrical coupling surface and the upper surface. The photonic silicon chip further includes at least one waveguide terminating at the optical coupling surface, a first socket and a second socket within the upper surface, and a first sphere and a second sphere within the first socket and the second socket, respectively. The connector body includes a first alignment feature, a second alignment feature, a mounting surface, a groove within the mounting surface, and a first contact pad and a second contact pad extending from the mounting surface and on opposite sides of the groove. The photonic silicon chip is disposed within a recess defined by the mounting surface of the connector body and the surface of the substrate. The first contact pad and the second contact pad contact the upper surface of the photonic silicon chip. The first sphere and the second sphere are disposed within the groove of the connector body.

In yet another embodiment, an optical port includes a substrate having a surface, a photonic silicon chip secured to the substrate, a wafer disposed on the photonic silicon chip, an alignment cylinder, and a connector body secured to the substrate. The photonic silicon chip includes an electrical coupling surface, an upper surface and an optical coupling surface, wherein the optical coupling surface is positioned between the electrical coupling surface and the upper surface. The photonic silicon chip further includes at least one waveguide terminating at the optical coupling surface. The wafer is disposed on the upper surface of the photonic silicon chip. The wafer includes an upper surface, a groove within the upper surface, and a first bore and a second bore within the upper surface, wherein the first bore and the second bore are on opposite sides of the groove and proximate the mechanical coupling surface. The alignment cylinder is disposed within the groove of the wafer. The connector body includes a first alignment feature, a second alignment feature, a mounting surface, a groove within the mechanical coupling surface, and a first alignment peg and a second alignment peg extending from the mounting surface on opposite sides of the groove. The photonic silicon chip is disposed within a recess defined by the mounting surface of the connector body and the surface of the substrate. The first alignment peg and the second alignment peg are disposed within the first bore and the second bore of the wafer, respectively. The alignment cylinder is disposed within the groove of the connector body.

In yet another embodiment, an optical port includes a substrate having a surface, a photonic silicon chip secured to the surface, and a connector body secured to the surface. The surface of the substrate has a plurality of grooves. A plurality of electrically conductive elements is disposed within the plurality of grooves. The photonic silicon chip includes an electrical coupling surface, an upper surface and an optical coupling surface, wherein the optical coupling surface is positioned between the electrical coupling surface and the upper surface, and the electrical coupling surface contacts the surface of the substrate. The photonic silicon chip further includes at least one waveguide terminating at the optical coupling surface, and a chip engagement feature disposed on the upper surface. The plurality of electrically conductive elements electrically couples the photonic silicon chip to the substrate. The connector body includes a first alignment feature, a second alignment feature, a mounting surface, wherein the photonic silicon chip is disposed within a recess defined by the mounting surface of the connector body and the surface of the substrate, and a connector engagement feature at the mounting surface. The connector engagement feature mates with the chip engagement feature of the photonic silicon chip.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Embodiments described herein are directed to optical ports that enable passive alignment with mated optical connectors. Various reference datum surfaces are provided for vertical axis control, as well as various mechanical features for horizontal axis control, thereby providing an optical port that provides passive precision alignment and assembly. The optical ports described herein set the waveguides of the photonic silicon chip at a known position with respect to alignment features of the connector body. The optical ports described herein do not require expensive active alignment systems to connect an optical connector to the optical port.

Various embodiments of optical ports enabling the use of passive alignment connectivity are described in detail below.

Figure 1:
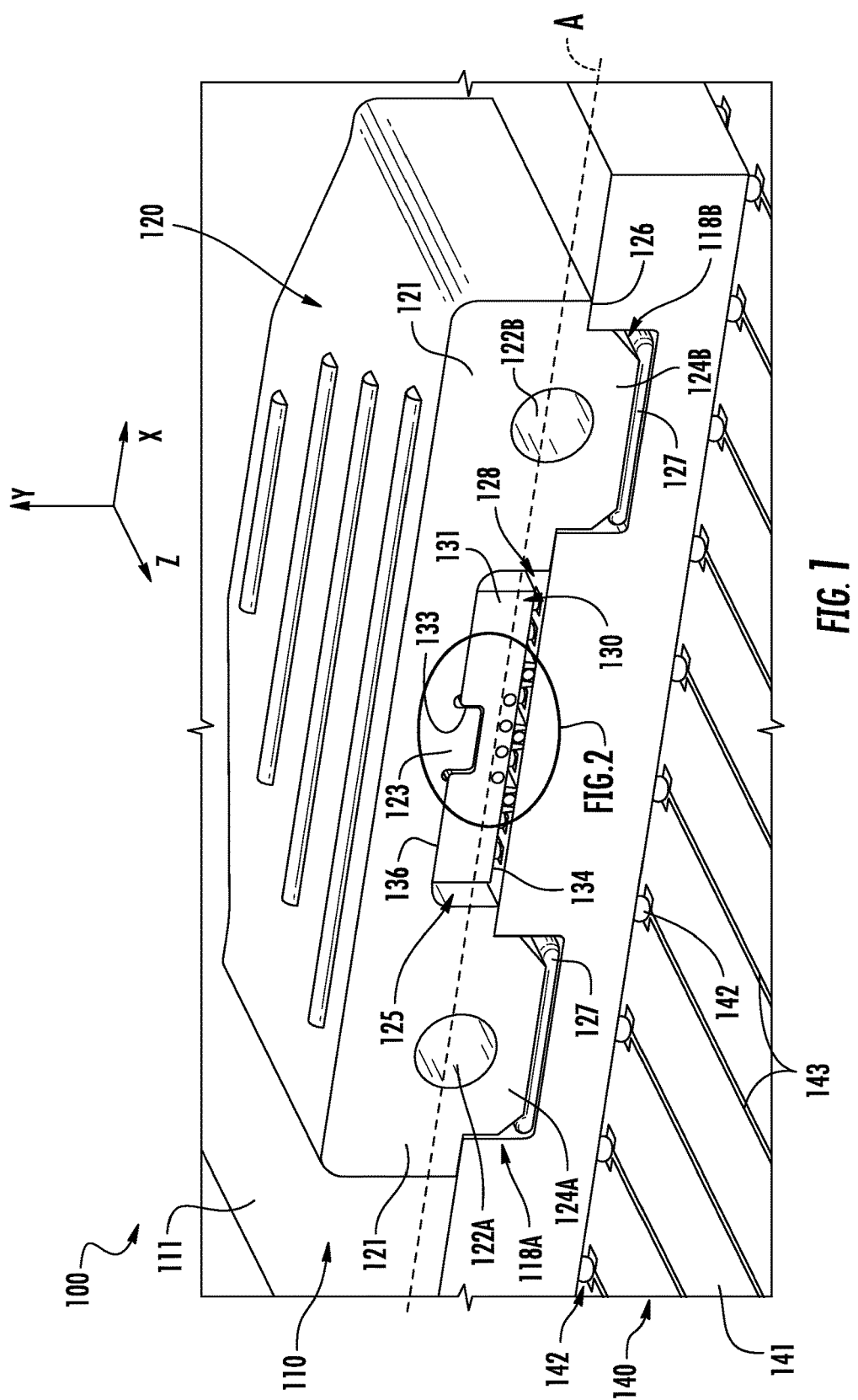
FIG. 1 is a perspective view of an example optical port according to one or more embodiments shown and described herein.
Figure 2:
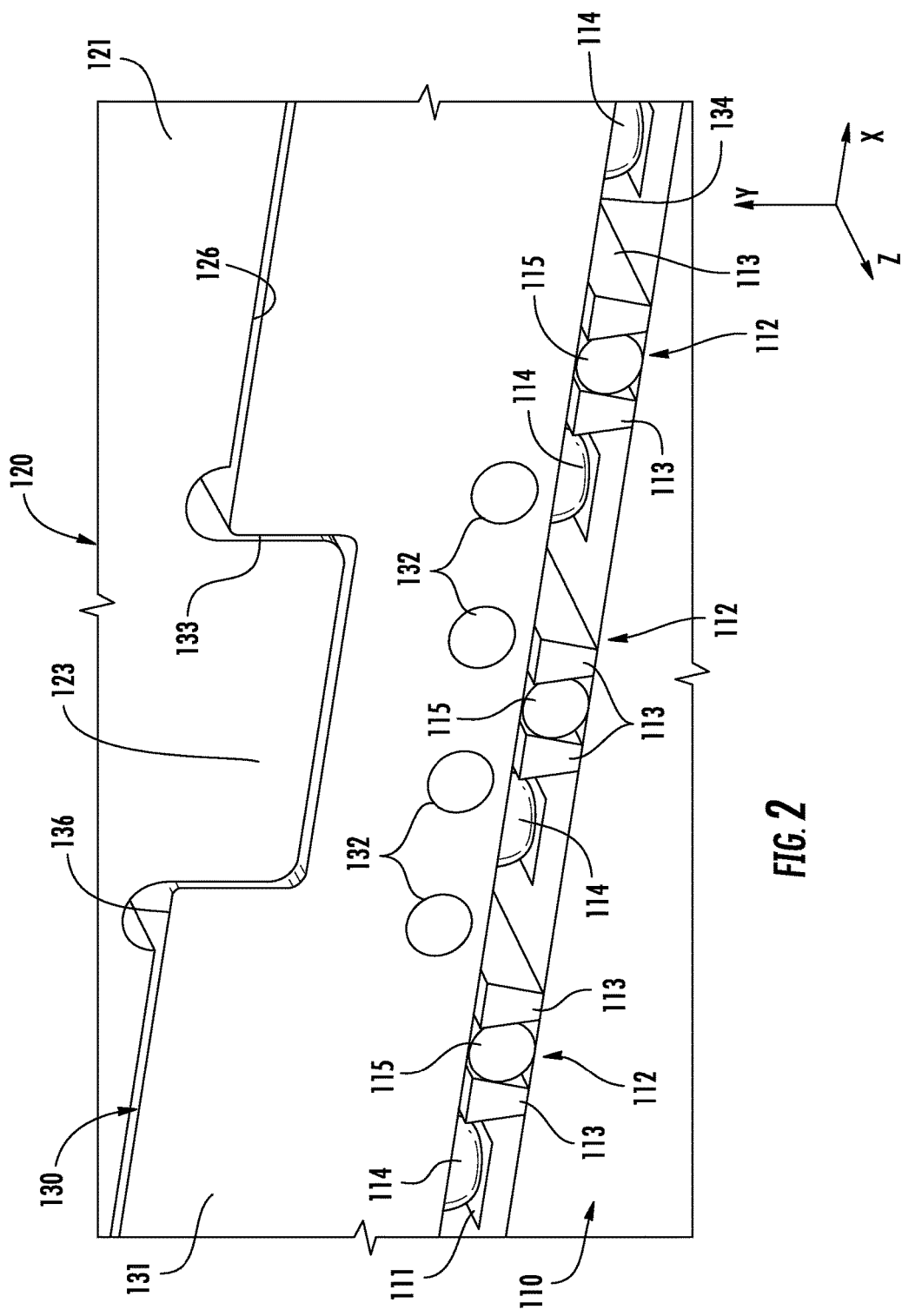
FIG. 2 is a close-up perspective view of the example optical port illustrated in FIG. 1.
Figure 3:
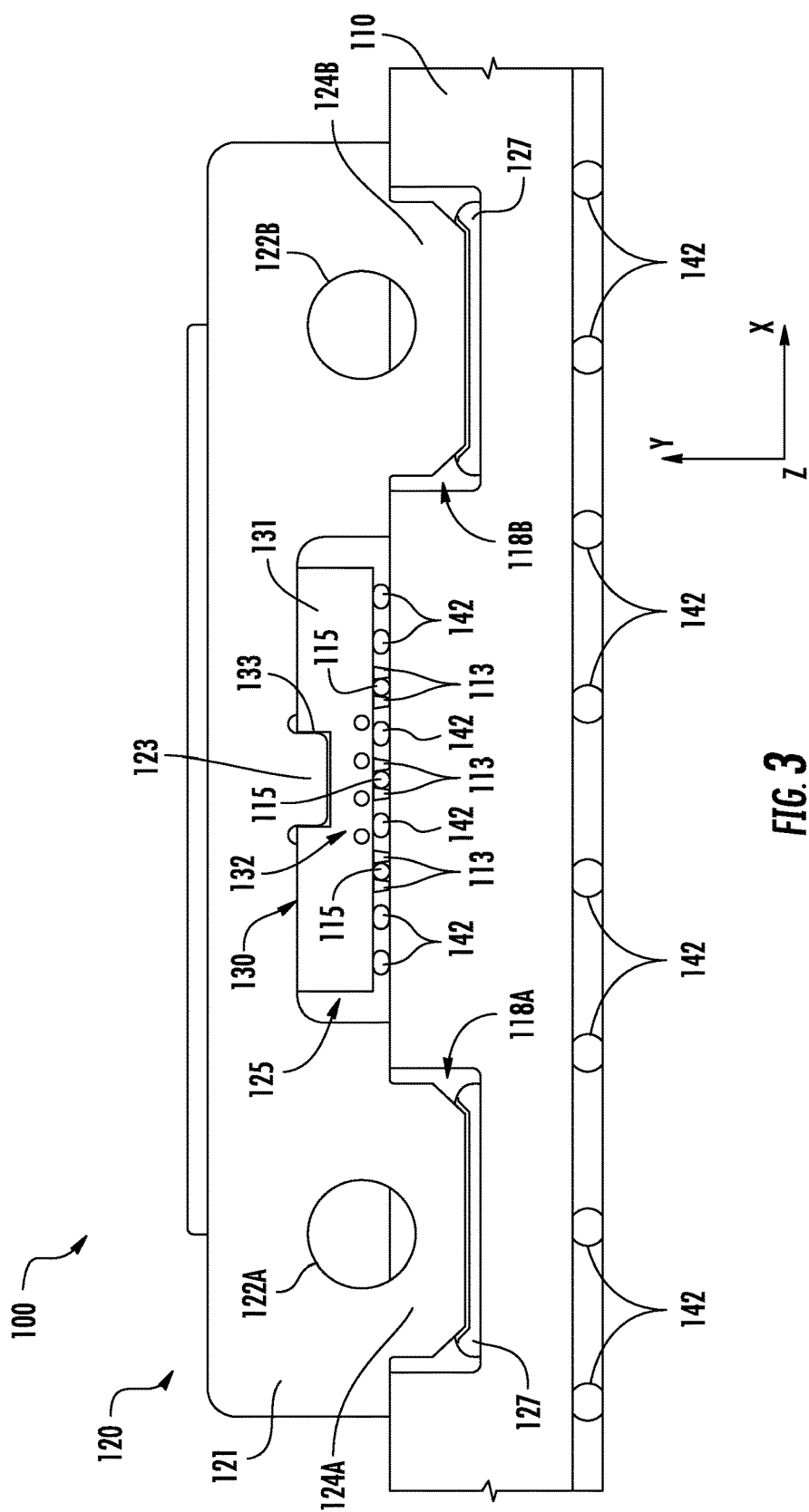
FIG. 3 is a front elevation view of the example optical port illustrated in FIG.

Referring now to FIGS. 1-3, an example optical port 100 is schematically illustrated in a perspective view. FIG. 1 is a perspective view of the example optical port. FIG. 2 is a close-up perspective view of the example optical port 100 shown in FIG. 1. FIG. 3 is a front elevation view of the example optical port 100 shown in FIGS. 1 and 2. Generally, the optical port 100 includes a substrate 110, a photonic silicon chip 130, and a connector body 120. The optical port 100 may be coupled to an additional substrate, such as a circuit board 140 that is a component of a computing device (e.g., a server, switch, router, general purpose computer, portable computing device, and the like). The illustrated substrate is a circuit board 140 having a mounting surface 141 to which the optical port 100 is coupled. The circuit board 140 may be made of a material such as FR-4, glass, ceramic and the like. The illustrated circuit board 140 further includes electrical traces 142. The optical port 100 may be electrically coupled to the electrical traces 142 of the circuit board 140. In the illustrated embodiment, the substrate 110 of the example optical port 100 is electrically coupled to the circuit board 140 by a ball grid array 142 interface. However, it should be understood that other electrical connection interface configurations may be utilized.

The substrate 110 is operable to receive the photonic silicon chip 130 and the connector body 120 at a surface 111. The material of the substrate 110 should be chosen to substantially match the coefficient of thermal expansion ("CTE") of the photonic silicon chip 130. As used herein, "substantially matched CTE" between the photonic silicon chip 130 and a substrate means within 5.5 ppm of the CTE of the photonic silicon chip. Non-limiting examples of the material for the substrate 110 include ceramic and silicon. As will be described in more detail below, the surface 111 of the example substrate 110 includes a first trench 118A and a second trench 118B to receive leg portions of the connector body 120.

The photonics silicon chip 130 may be configured as any silicon photonics chip, such as a hybrid laser silicon chip or a Raman laser silicon chip, for example. The photonic silicon chip 130 comprises one or more optical sources (not shown) that produce one or more laser beams that propagate within waveguides 132 of the photonic silicon chip 130. Additionally or alternatively, the photonic silicon chip 130 may include one or more photo detectors (not shown) operable to receive one or more laser beams propagating within waveguides 132 of the photonic silicon chip 130 and, along with additional electrical components, convert the one or more laser beams into electrical signals.

The photonic silicon chip 130 includes an electrical coupling surface 134, an upper surface 136, and an optical coupling surface 131. In some embodiments, the electrical coupling surface 134 is opposite and parallel to the upper surface 136, and the optical coupling surface 131 is substantially orthogonal with respect to the electrical coupling surface 134 and the upper surface 136. Accordingly, the example photonic silicon chip 130 employs a "side facet" configuration in which optical signals are emitted from a side surface of the photonic silicon chip 130, and are not optically turned ninety degrees prior to exiting the photonic silicon chip 130.

A thickness of the photonic silicon chip 130 is precisely controlled to within a desired tolerance (e.g., ±1-3 µm). The thickness of the photonic silicon chip 130 may be controlled by a lapping process, for example.

As shown in FIGS. 1-3, one or more optical waveguides 132 (hereinafter waveguides) terminate at the optical coupling surface 131 of the photonic silicon chip 130. Although four waveguides 132 are illustrated in FIGS. 1-3, it should be understood that more or fewer waveguides 132 may be provided. The waveguides 132 are configured as silicon regions within or on a surface of the photonic silicon chip 130 having a modified index of refraction to guide optical signals (e.g., laser signals) propagating therein. The waveguides 132 within the medium of the photonic silicon chip 130 (e.g., silicon) may be fabricated by a laser writing process, wherein the index of refraction of the material is modified by the application of a laser beam. It should be understood that other waveguide fabrication techniques may also be utilized.

The electrical coupling surface 134 of the photonic silicon chip 130 is electrically coupled to the surface 111 of the substrate 110. As shown in FIGS. 1 and 2, the example photonic silicon chip 130 is electrically coupled to the surface of the substrate 110 by a ball grid array 114. It is noted that the substrate 110 includes internal electrically conductive vias that pass electrical signals between the photonic silicon chip 130 and the circuit board 140.

Referring specifically to FIG. 2, a plurality of spacer elements 112 are disposed between the electrical coupling surface 134 of the photonic silicon chip 130 and the surface 111 of the substrate 110. The height of each spacer element 112 is precisely controlled to control the position of the electrical coupling surface 134 of the photonic silicon chip 130 with respect to the surface 111 of the substrate 110. Use of the plurality of spacer elements 112 enable the surface 111 of the substrate 110 to function as a vertical (i.e., y-axis) reference datum. This allows precise and repeatable placement of the waveguides 132 of the photonic silicon chip 130 in the vertical direction.

In the illustrated embodiment, each spacer element 112 is configured as an optical fiber 115 disposed between a pair of gripper elements 113. In this case, the optical fibers do not carry an optical signal, but instead are used for precision geometry. Consequently, the optical fiber need not be functional. The gripper elements 113 may be fabricated from a material having a coefficient of friction and compliance enabling the retention of the optical fiber 115 in a set position between the photonic silicon chip 130 and the substrate 110. As a non-limiting example, the gripper elements 113 may be made of a polymer material. The gripper elements 113 may be disposed on either the surface 111 of the substrate 110 or the electrical coupling surface 134 of the photonic silicon chip 130 prior to positioning the photonic silicon chip 130 onto the surface 111 of the substrate 110. As an example and not a limitation, the gripper elements 113 may be printed or otherwise disposed on the surface 111 of the substrate 110 or the electrical coupling surface 134 of the photonic silicon chip 130. The gripper elements 113 maintain the optical fibers 115 prior to solder reflow and bonding processes. Further, the glass-based optical fibers 115 can withstand the solder reflow and bonding processes while still maintaining geometric control.

The optical fibers 115 may be glass fibers having a CTE substantially matching the CTE of the photonic silicon chip 130. The outer diameter of the optical fibers 115 is precisely controlled (e.g., to within 1 µm) to allow the electrical coupling surface 134 to be located in a known, fixed position on the y-axis with respect to the surface 111 of the substrate 110. As an example and not a limitation, the outer diameter of the optical fibers 115 may be between 80 and 125 µm. As shown in FIG. 2, the spacer elements 112 are disposed between adjacent solder balls of the ball grid array 114.

Although the spacer elements 112 are illustrated as comprising an optical fiber 115 disposed between a pair of gripper elements 113, embodiments are not limited thereto. For example, the spacer elements 112 may only include the optical fiber and not the gripper element, or the spacer elements may be configured as an element other than an optical fiber (e.g., a strip of a ceramic or glass material). The configuration of the plurality of spacer elements 112 should be such that the distance between the electrical coupling surface 134 of the photonic silicon chip 130 and the surface 111 of the substrate 110 is precisely controlled within a desired tolerance (e.g., ±1 µm) after the photonic silicon chip 130 is electrically coupled and bonded to the substrate 110.

After the plurality of spacer elements 112 are disposed between the photonic silicon chip 130 and the substrate 110, the photonic silicon chip 130 may be electrically and physically coupled to the substrate 110 by a solder reflow process, for example. In some embodiments, the photonic silicon chip 130 may be further bonded to the substrate 110 by an adhesive underfill disposed between the surface 111 of the substrate 110 and the electrical coupling surface 134 of the photonic silicon chip 130.

Referring to FIGS. 1-3, the connector body 120 generally includes a mounting surface 126, a mechanical coupling surface 121, a first alignment feature configured as a first alignment bore 122A, and a second alignment feature configured as a second alignment bore 122B. The connector body 120 may be a molded component, for example, having tightly controlled tolerances (e.g., ±1 µm).

The first and second alignment bores 122A, 122B are exposed at the mechanical coupling surface 121 and are operable to receive alignment pins of a mated optical connector (not shown). The first and second alignment bores 122A, 122B passively position and align (i.e., without vision alignment being necessary) the mated optical connector with respect to the waveguide(s) 132 of the optical port 100. It should be understood that embodiments described herein are not limited by the number and placement of alignment bores shown in FIGS. 1-3. In alternative embodiments, the connector body 120 of the optical port 100 includes alignment pins (not shown) and the mated optical connector includes alignment bores. Further, in some embodiments, each of the connector body 120 of the optical port 100 and the mated optical connector includes at least one of an alignment pin and an alignment bore. Other alignment features may be utilized in addition to, or in lieu of, the alignment bores and/or alignment pins.

In the illustrated embodiment, the connector body 120 includes a first leg portion 124A and a second leg portion 124B extending from the mounting surface 126. A notch 128 is provided within the space between the first and second leg portions 124A, 124B. The first and second alignment bores 122A, 122B may be positioned at least partially within the first and second legs 124A, 124B, respectively. The first and second legs 124A, 124B are disposed within the first and second trenches 118A, 118B of the substrate 110, respectively. The first and second legs 124A, 124B may be secured to the substrate 110 by an adhesive 127 within the first and second trenches 118A, 118B, for example.

When the connector body 120 is secured to the substrate 110, a center of the first and second alignment bores 122A, 122B (or other alignment feature as the case may be), may be positioned along a centerline A defined by the center of the waveguides 132 of the photonic silicon chip 130 (FIG. 1).

Further when the connector body 120 is secured to the substrate 110, a recess 125 is defined by the space between the notch 128 in the mounting surface 126 of the connector body 120 and the surface 111 of the substrate 110. The recess 125 is shaped such that the photonic silicon chip 130 is disposed therein as shown in FIGS. 1-3.

As noted hereinabove, vertical height control (i.e., along the y-axis) is provided by the use of the plurality of spacer elements 112. Lateral control (i.e., along the x-axis) is provided by a chip engagement feature 133 within the upper surface 136 of the photonic silicon chip 130 and a corresponding connector engagement feature 123 extending from the mounting surface 126 of the connector body 120.

As shown in FIGS. 1-3, the connector engagement feature 123 of the connector body 120 is configured as a rib portion 123 that extends from the mounting surface 126 of the connector body 120. The rib portion 123 may be a precision molded component having dimensional tolerances within a desired range (e.g., ±1 µm).

Figure 4:
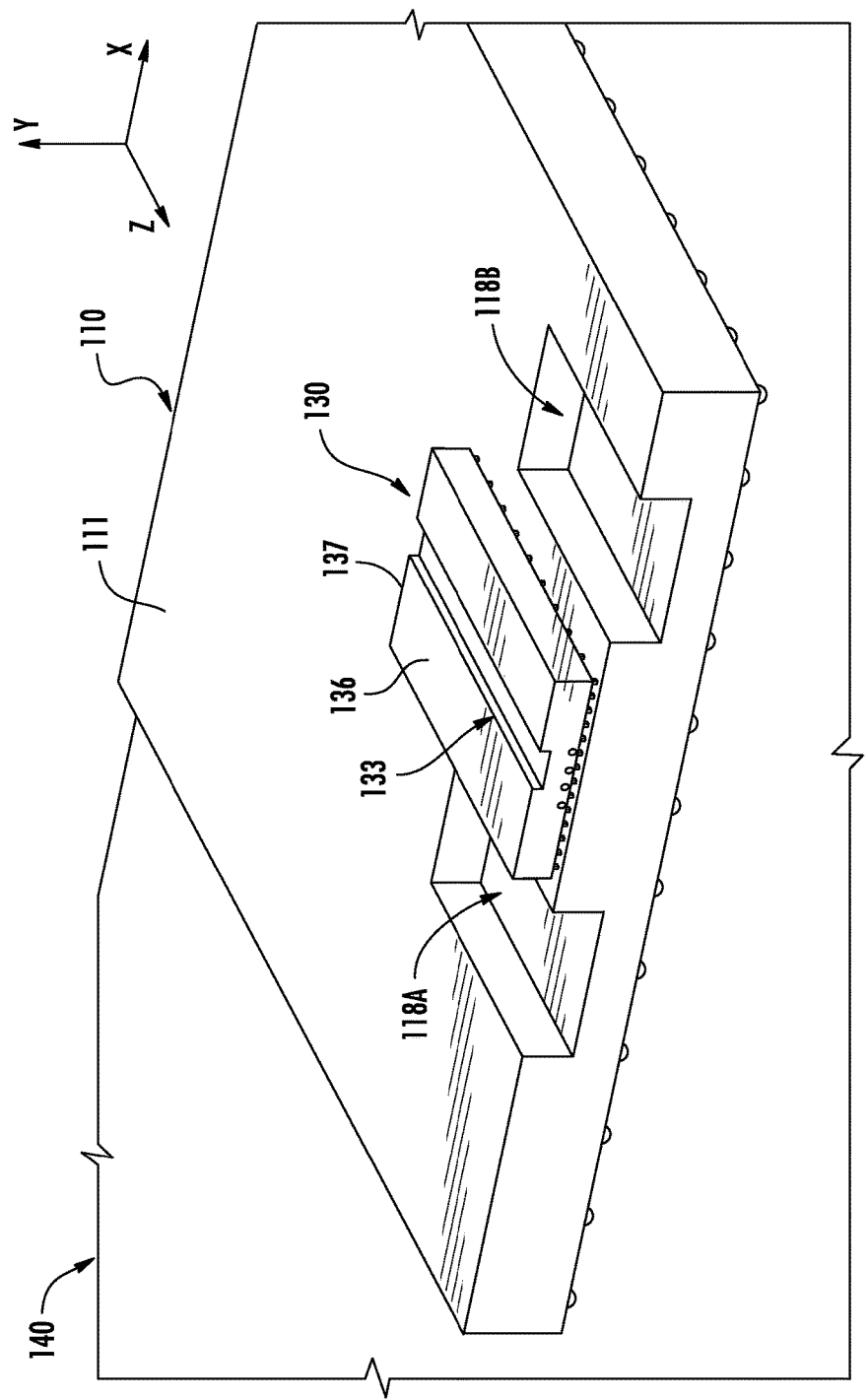
FIG. 4 is a perspective view of a substrate and a photonic silicon chip of the example optical port illustrated in FIG. 1 according to one or more embodiments shown and described herein.

Referring to FIG. 4 in addition to FIGS. 1-3, the chip engagement feature 133 may be configured as a groove 133 within the upper surface 136 of the photonic silicon chip 130. The groove 133 extends from the optical coupling surface 131 to a rear surface 137 of the photonic silicon chip 130. The groove 133 may be formed using deep reactive ion etching, for example.

The rib portion 123 of the connector body 120 is sized and positioned to be disposed within the groove 133 of the photonic silicon chip 130 when the connector body 120 is secured to the surface 111 of the substrate 110. The placement of the rib portion 123 within the groove 133 therefore provides lateral control in the x-axis direction.

Accordingly, the plurality of spacer elements 112 enable the surface 111 of the substrate 110 to be a vertical (i.e., y-axis) reference datum for locating the waveguides 132. The rib portion 123 and the groove 133 cooperate to reference the connector body 120 with respect to the waveguides 132 along the x-axis. When the mated optical connector (not shown) is coupled to the optical port 100, the waveguides of the mated optical connector are substantially aligned with the waveguides 132 of the optical port 100 (i.e., within at least ±2.0 µm depending on material and operating conditions) without the use of active alignment techniques, such as those that employ vision systems.

It is noted that the mated optical connector may be permanently connected to the optical port 100 using an optical adhesive in some embodiments. In de-mateable applications, other mechanical features such as latching arms may be utilized to provide for de-mateable optical connections.

Figure 5:
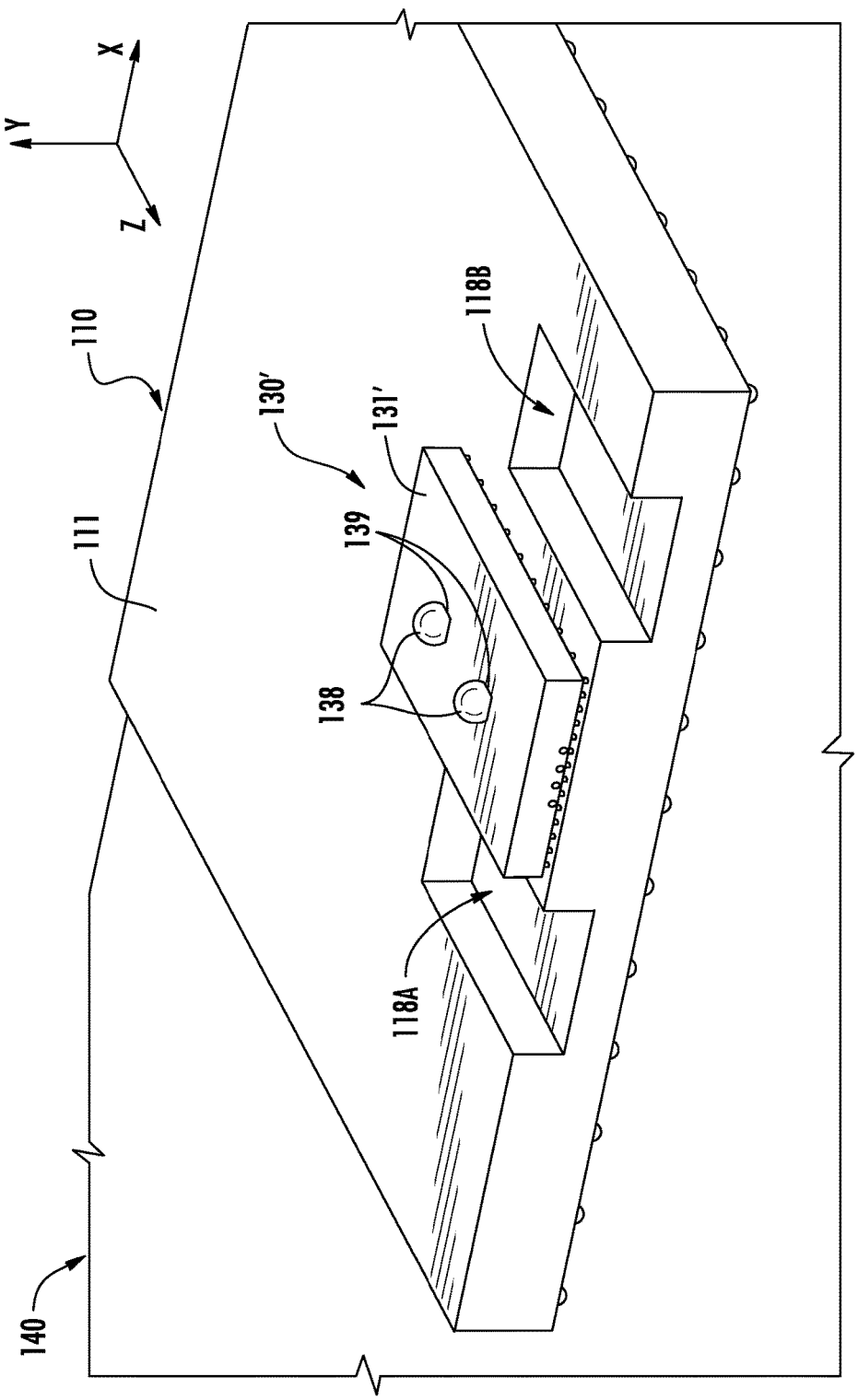
FIG. 5 is a perspective view of a substrate and a photonic silicon chip of an example optical port according to one or more embodiments shown and described herein.

Referring now to FIG. 5, another example of a chip engagement feature of a photonic silicon chip 130' is schematically illustrated. The chip engagement feature is configured as at least two sockets 139 formed within the upper surface 131' of the photonic silicon chip 130', and a sphere 138 is disposed within each of the at least two sockets 139. Although, described as a sphere the element need not be perfectly spherical, but should be able to provide the desired precision for alignment. The at least two sockets 139 may be formed by deep reactive ion etching, for example. In some embodiments, each sphere 138 may be fabricated from a metal material, such as a solder material, for example.

Figure 6:
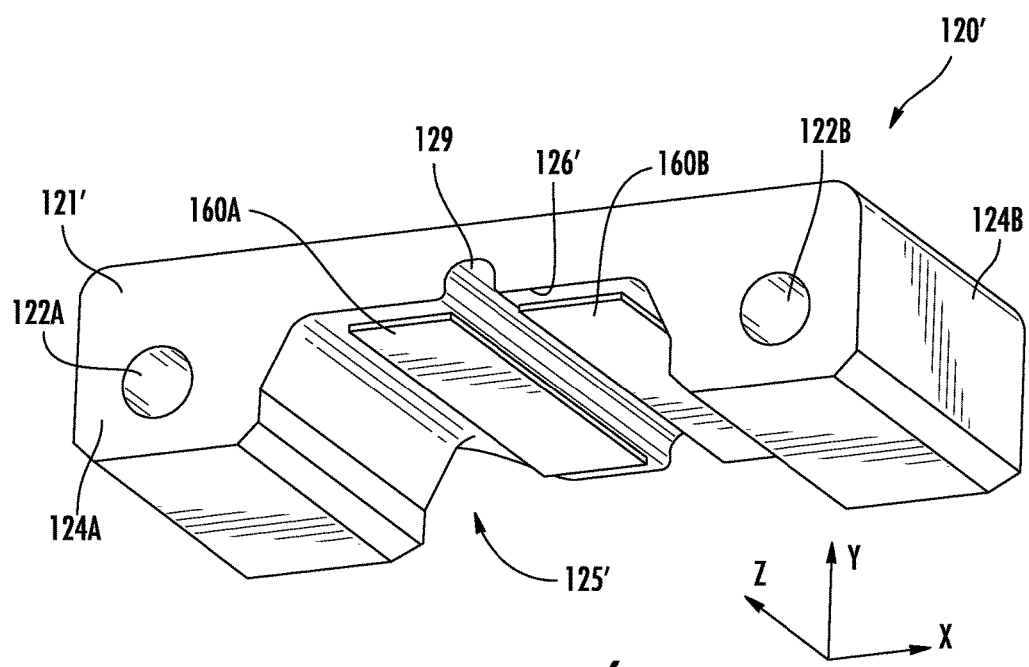
FIG. 6 is a perspective view of an example connector body of an optical port according to one or more embodiments shown and described herein.

Referring now to FIG. 6, the example connector engagement feature is configured as a groove 129 within the mounting surface 126' of the connector body 120'. When the connector body 120' is secured to the substrate 110 (e.g., as shown in FIGS. 1-3), each sphere 138 is disposed within the groove 129 of the connector body 120', thereby providing horizontal axis control (i.e., x-axis control). This "sphere in groove" engagement configuration may be utilized in conjunction with the vertical axis control (i.e., y-axis control) provided by the plurality of spacer elements 112 described above with reference to FIGS. 1-4.

Figure 7:
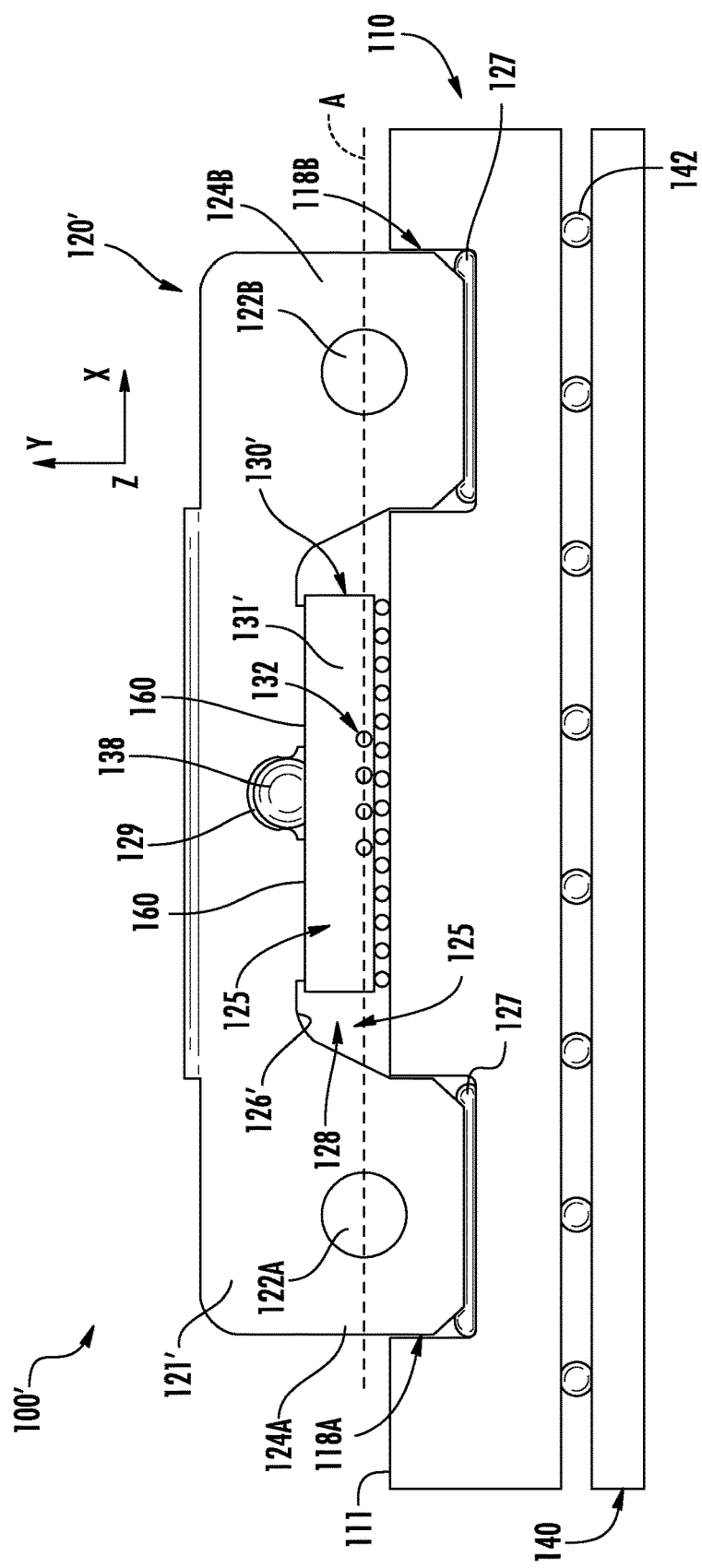
FIG. 7 is a front elevation view of an example optical port according to one or more embodiments shown and described herein.

Alternatively, control with respect to the y-axis may be driven by the photonic silicon chip 130. Referring to FIG. 6, the connector body 120' may also include a first contact pad 160A and a second contact pad 160B extending from the mounting surface 126' on adjacent sides of the groove 129 described above. In this example, the thickness of the photonic silicon chip 130' is controlled such that the upper surface 136' of the photonic silicon chip 130' provides a vertical reference datum. Referring to FIG. 7, an example optical port 100' is schematically illustrated. When the connector body 120' is secured to the surface 111 of the substrate 110, the first and second contact pads 160A, 160B contact the upper surface 136' of the photonic silicon chip 130'. The tolerances of the connector body 120' are tightly controlled (e.g., within ±1.0 µm), which thereby establishes the position of the waveguides 132 with respect to the first and second alignment bores 122A, 122B (or other alignment feature(s)) of the connector body 120'. As noted hereinabove, horizontal axis control is provided by the spheres 138 of the photonic silicon chip 130' and the groove 129 of the connector body 120'.

Figure 8:
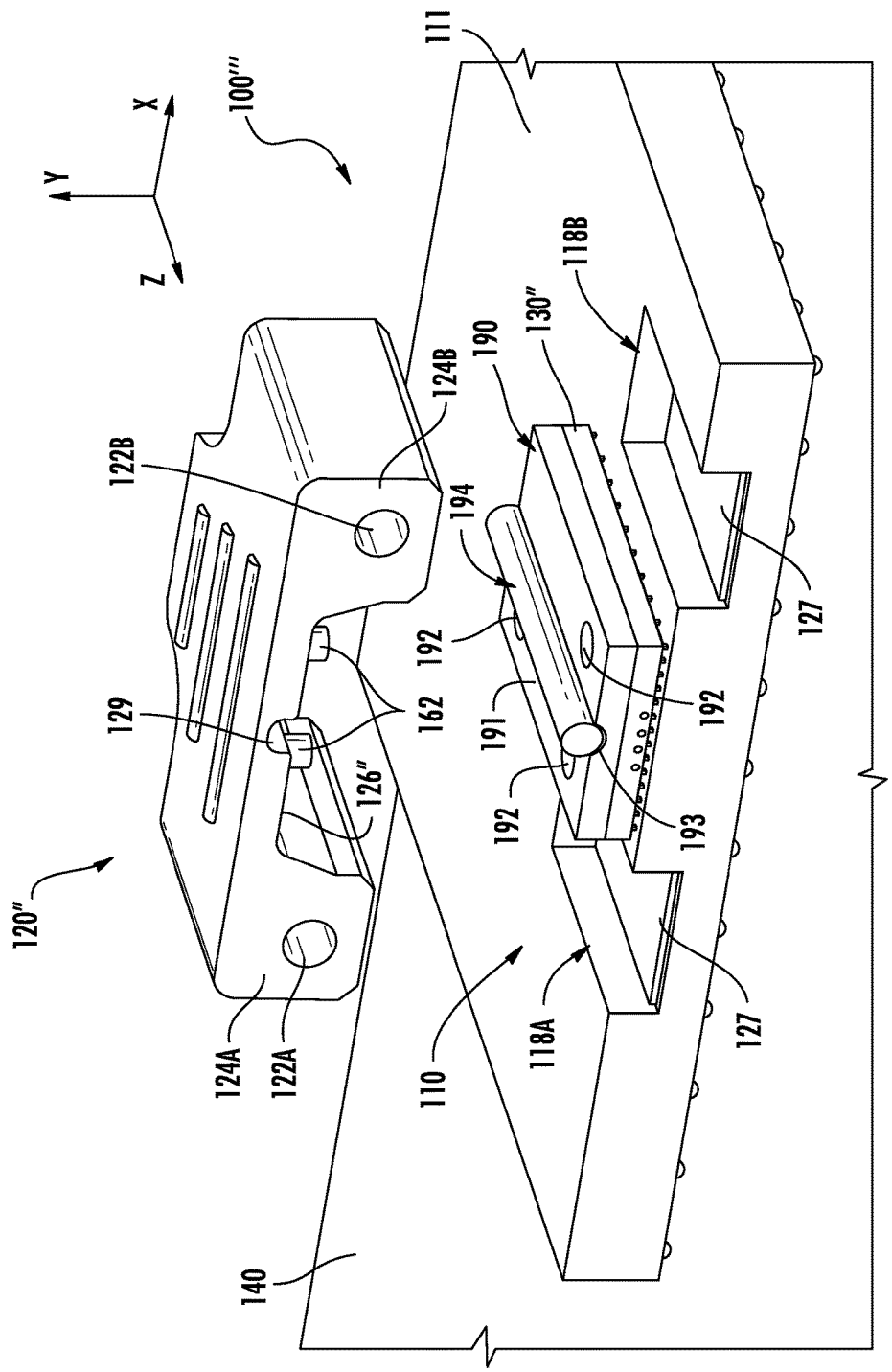
FIG. 8 is a partial exploded, perspective view of an example optical port according to one or more embodiments shown and described herein.
Figure 9:
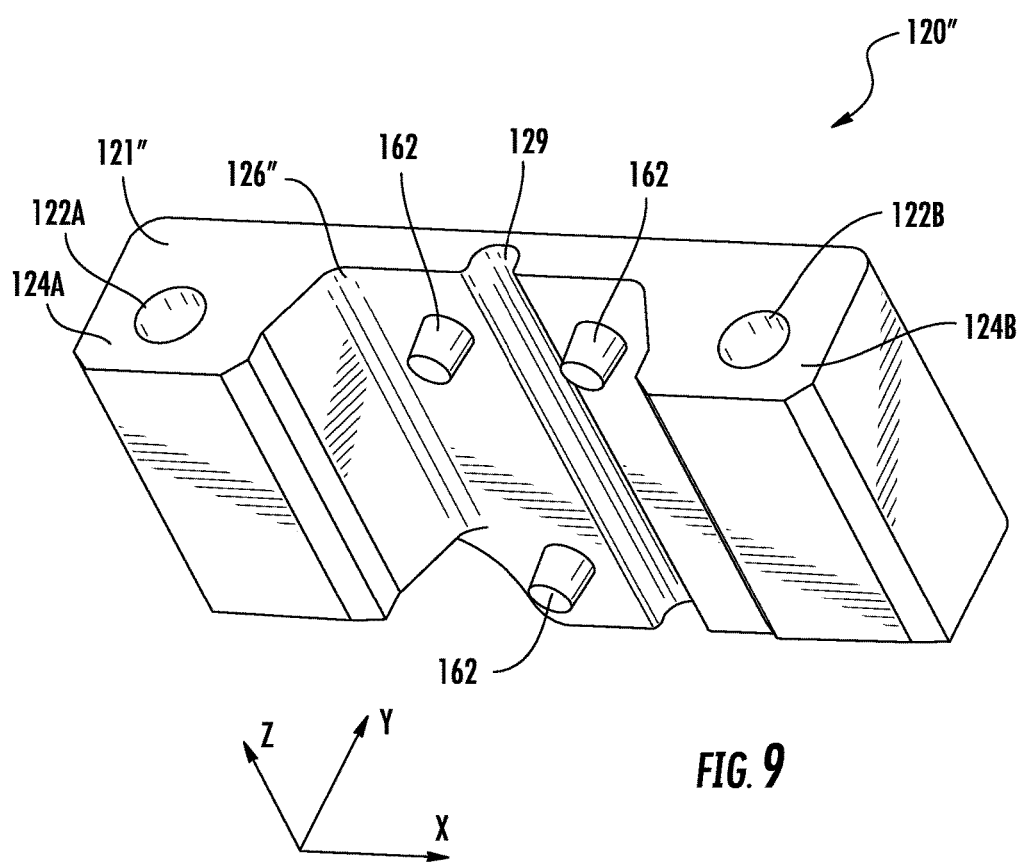
FIG. 9 is a perspective view of an example connector body of the optical port illustrated in FIG. 8 according to one or more embodiments shown and described herein.
Figure 10:
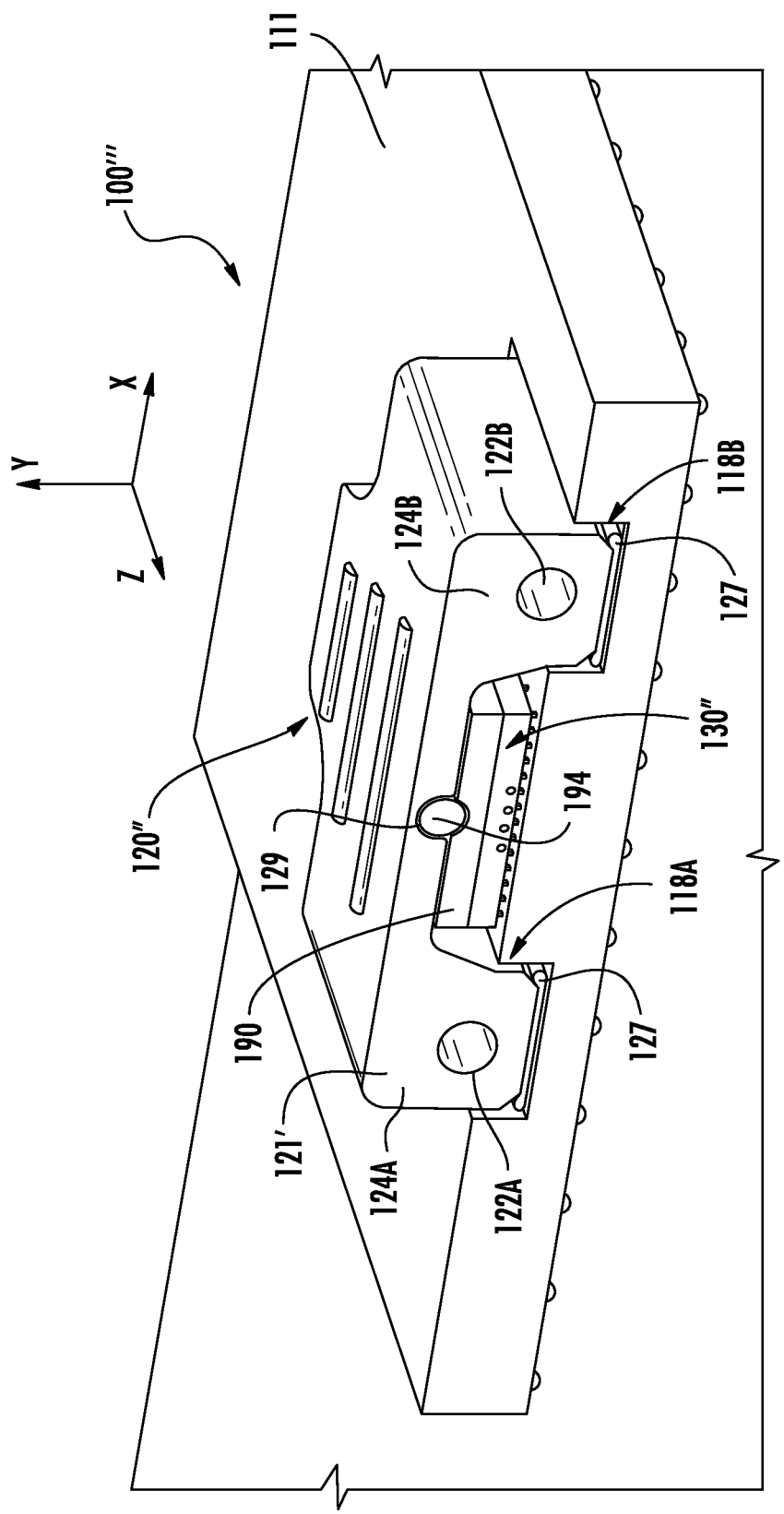
FIG. 10 is an assembled, perspective view of the example optical port illustrated in FIG. 8.
Figure 11:
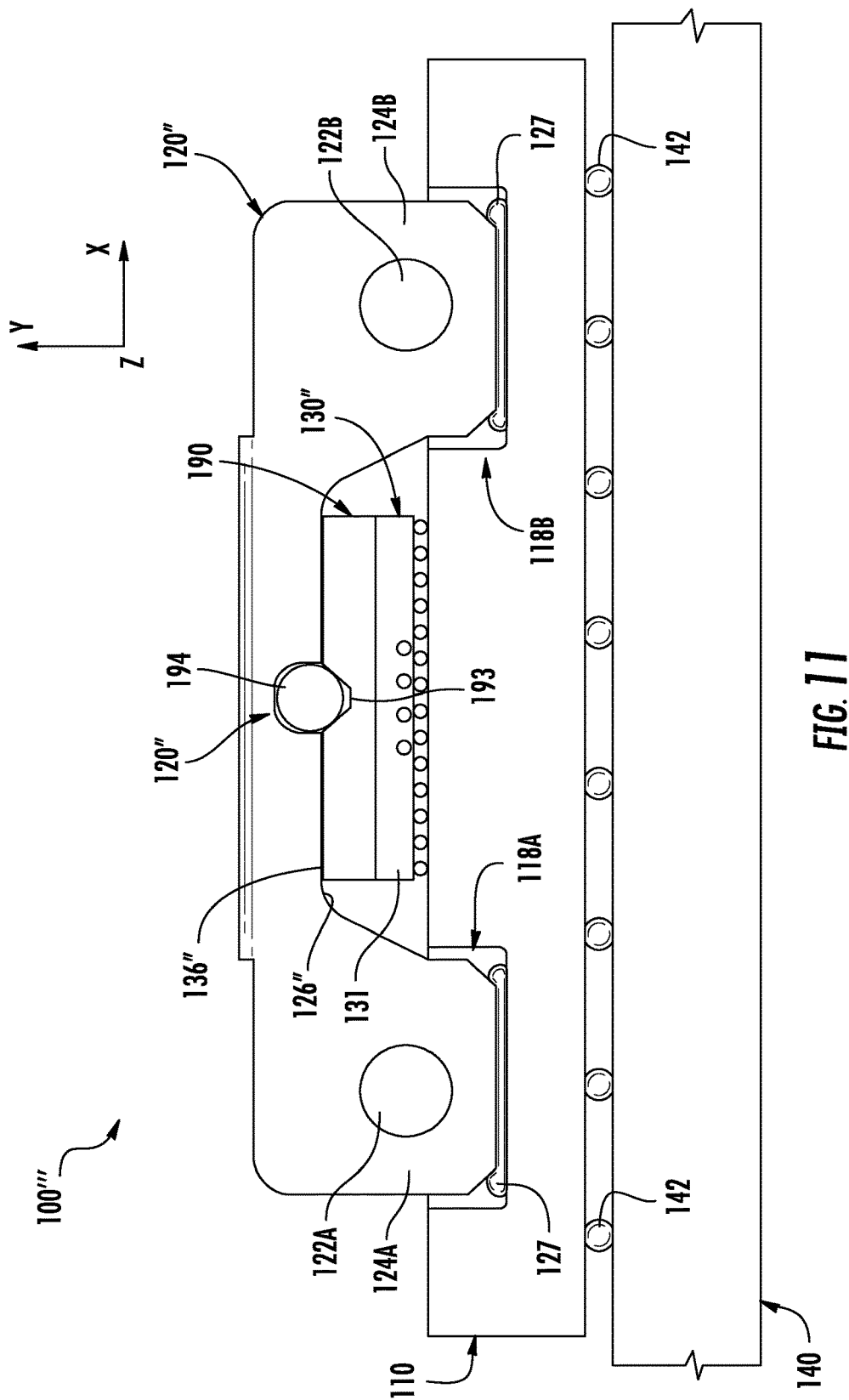
FIG. 11 is a front elevation view of the example optical port illustrated in FIG. 10.

Referring now to FIGS. 8-11, another example of an optical port 100" and a connector body 120" are schematically illustrated. FIG. 8 is a partial exploded perspective view of an example optical port 100". FIG. 9 is an underside, perspective view of an example optical port 100". FIG. 10 is an assembled, perspective view of the example optical port 100" shown in FIG. 8, while FIG. 11 is an assembled, front elevation view of the optical port 100" shown in FIGS. 8 and 10.

Referring specifically to FIG. 8, the optical port 100" includes a wafer 190 positioned on the upper surface 136" of the photonic silicon chip 130". The wafer 190 may be aligned and bonded to the upper surface 136" of the photonic silicon chip 130" prior to dicing of the photonic silicon chip 130", for example. The height of the wafer 190 in the y-axis direction is precisely controlled to be within a desired tolerance (e.g., within ±1.0 µm). For example, the height of the wafer 190 may be controlled by a wafer lapping process such that the desired height is achieved. By tightly controlling the height of the wafer 190, the upper surface 136" of the photonic silicon chip 130" may be used as a vertical height datum (i.e., a y-axis reference datum).

The material of the wafer 190 should be chosen so that it has a CTE that substantially matches that of the photonic silicon chip 130". As an example and not a limitation, the material of the wafer 190 may be silicon.

The wafer 190 includes a groove 193 in which an alignment cylinder 194 is disposed. The outer diameter of the alignment cylinder 194 should be tightly controlled (e.g., within ±0.1 µm) so that it may provide x-axis control as described in more detail below. The groove 193 may be a "V" shaped groove, for example, but other shapes may be possible. The groove 193 may be formed by any suitable process. As a non-limiting example, the groove 193 may be formed by deep reactive ion etching.

The alignment cylinder 194 may be fabricated from a material having a CTE that substantially matches the CTE of the photonic silicon chip 130". The alignment cylinder 194 may be fabricated from, without limitation, glass, ceramic, or a glass-filled polymer material. The outer diameter of the alignment cylinder 194 should be controlled within a desired tolerance, such as, without limitation less than 100 nm (e.g., within ±0.1 µm.

The wafer 190 includes at least two bores 192. In the illustrated embodiment, two bores 192 are provided near a first edge (i.e., a front edge) of the wafer 190 on opposite sides of the groove 193, and a third bore is provided near a second edge (i.e., a rear edge) of the wafer 190. The bores 192 may be formed by any process, such as, without limitation, a drilling process or a deep reactive ion etching process.

Referring to FIG. 9, the mounting surface 126" of the connector body 120" includes a groove 129 at least two alignment pegs 162 extending therefrom. The placement and configuration of the alignment pegs 162 should be such that they may be disposed within the alignment bores 192 of the wafer 190. It is noted that the shape of the bores 192 and the alignment pegs 162 are not limited to a cylindrical shape, and that other shapes may be utilized. In the illustrated example, the connector body 120" has two alignment pegs 162 near the mechanical coupling surface 121" on opposite sides of the groove 129, and a third alignment peg 162 near a surface opposite from mechanical coupling surface 121".

Referring now to FIGS. 8, 10 and 11, the alignment cylinder 194 is disposed within the groove 193 of the upper surface 136" of the photonic silicon chip 130". The connector body 120" is coupled to the substrate 110 by positioning the first and second leg portions 124A, 124B into the first and second trenches 118A, 118B, which have adhesive 127 provided therein. When the connector body 120" is coupled to the substrate 110, the alignment pegs 162 of the connector body 120" are disposed within the alignment bores 192 of the wafer 190. Additionally, the alignment cylinder 194 is disposed within the groove of the connector body 120".

The bottom surface of the alignment pegs 162 provides the mating datum. When the adhesive 127 cures, it will pull the connector body 120" so that the bottom of the alignment pegs 162 contact the upper surface 136" of the photonic silicon chip 130". Referring specifically to FIG. 11, the upper half of the alignment cylinder 194 does not contact the surface of the groove 129 of the connector body 120". Additionally, the mounting surface 126" of the connector body 120" does not contact the upper surface 136" of the photonic silicon chip 130". Rather, only the bottom surface of the alignment pegs 162 contacts the vertical datum. The horizontal control (i.e., x-axis) is provided by the alignment cylinder 194 and the groove 129 of the connector body 120". In this manner, the location of the waveguides is controlled with respect to the first and second alignment bores 122A, 122B along the x- and y-axes.

Figure 12:
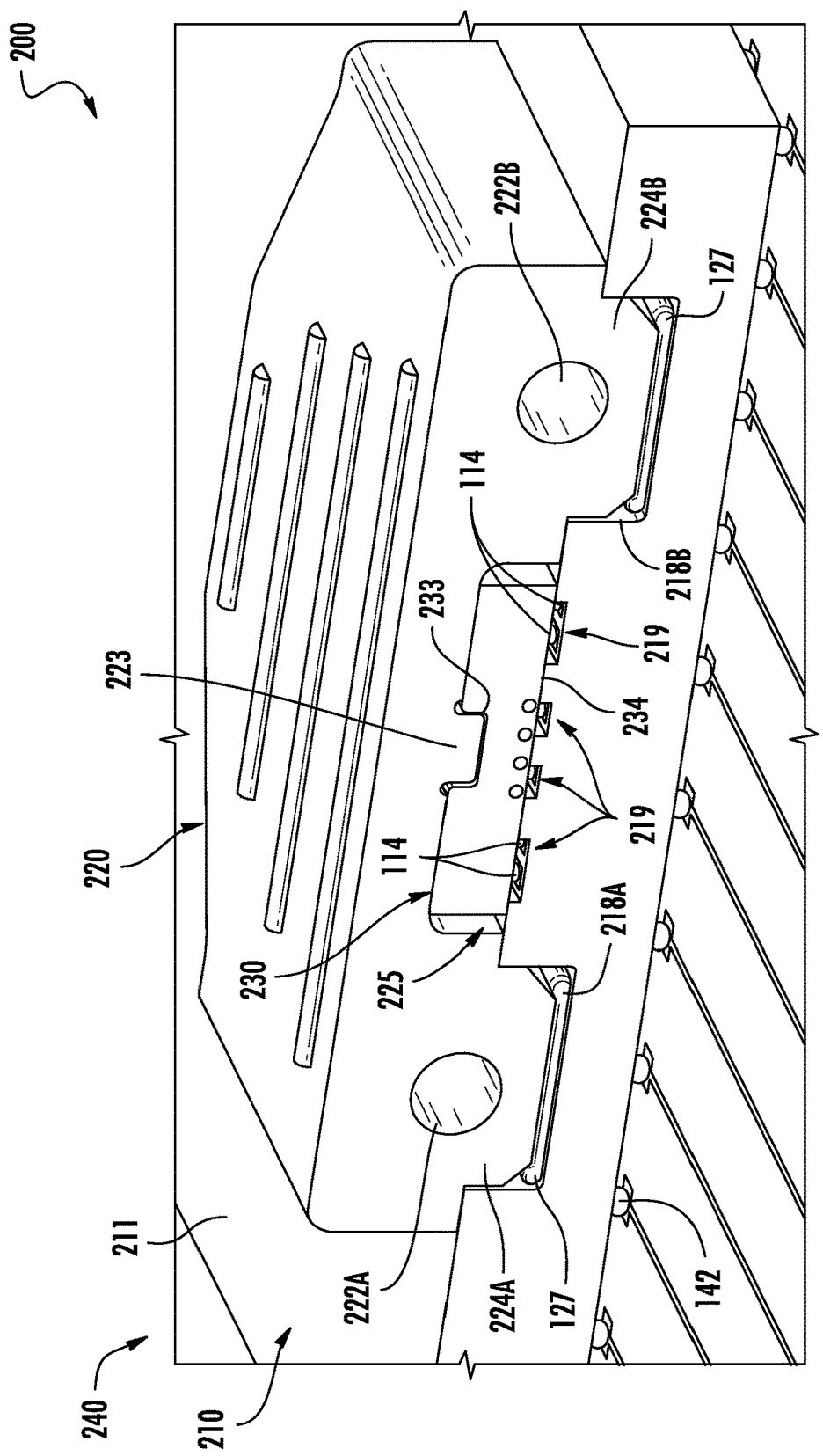
FIG. 12 is a perspective view of an example optical port according to one or more embodiments shown and described herein.
Figure 13:
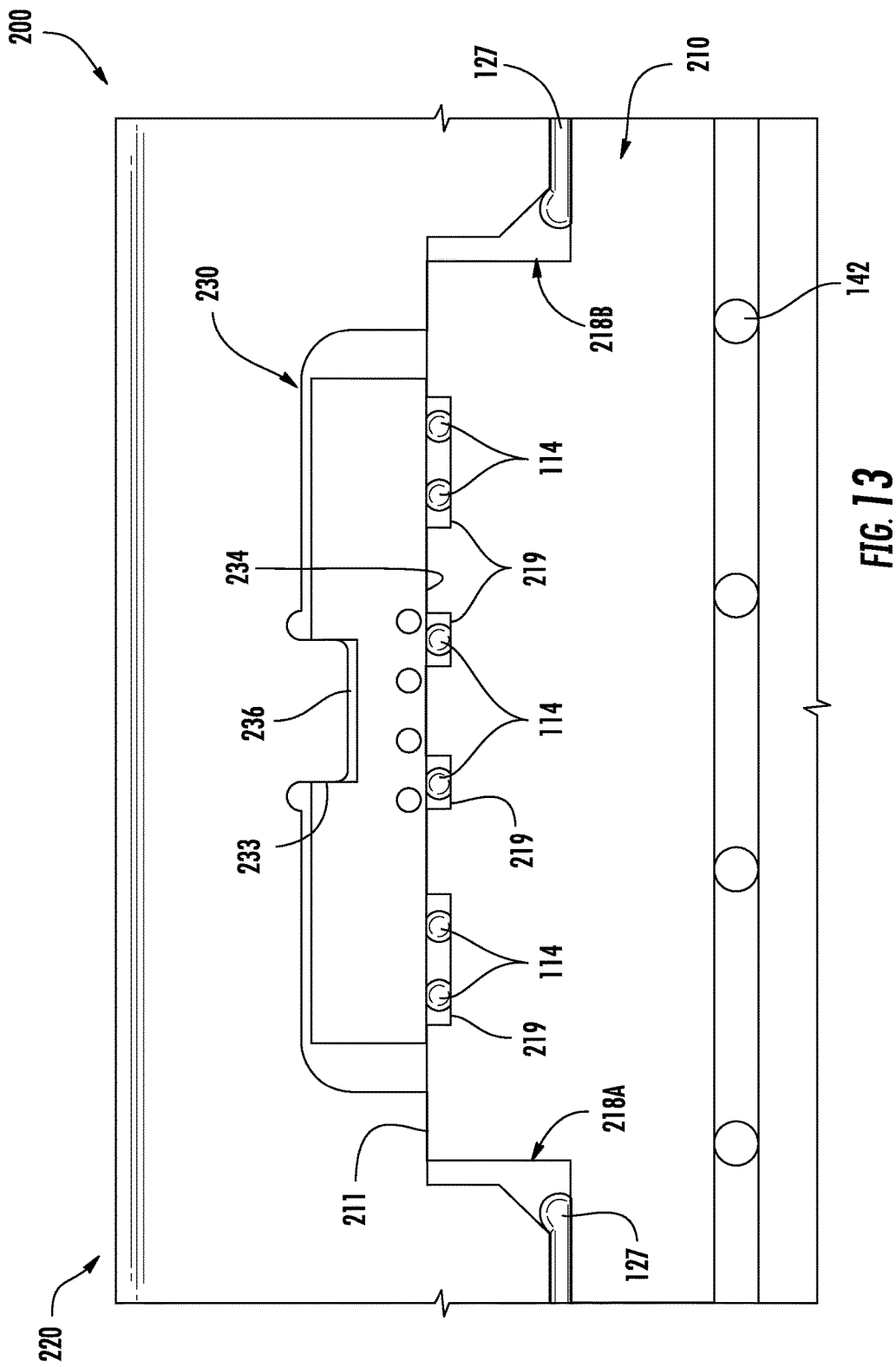
FIG. 13 is a front elevation view of the example optical port illustrated in FIG. 12.

Referring now to FIGS. 12 and 13, another example optical port 200 is schematically illustrated. FIG. 12 is a perspective view of the example optical port 200, and FIG. 13 is a front elevation view of the example optical port 200. Similar to the example optical ports described above, the example optical port 200 illustrated in FIGS. 12 and 13 include a substrate 210, a photonic silicon chip 230, and a connector body 220.

In the illustrated example, the vertical reference datum is provided by the surface 211 of the substrate 210. The surface 211 of the substrate 210 includes a first trench 218A and a second trench 218B for receiving a first leg portion 224A and a second leg portion 224B, respectively, as described above. A plurality of grooves 219 are provided within the surface 211 of the substrate 210 between the first and second trenches 218A, 218B. A plurality of electrically conductive elements 114 is disposed within the plurality of grooves 219. For example the plurality of electrically conductive elements 114 may be provided as a plurality of electrically conductive pads, and a plurality of solder balls of a ball grid array.

The photonic silicon chip 230 is disposed within a recess 225 between the connector body 220 and substrate 210 such that an electrical coupling surface 234 of the photonic silicon chip 230 contacts the surface 211 of the substrate 210. As shown in FIGS. 12 and 13, the plurality of electrically conductive elements 114 is within the plurality of grooves 219. The solder balls (i.e., the plurality of electrically conductive elements 114) pull the electrical coupling surface 234 of the photonic silicon chip 230 into contact with the surface 211 of the substrate 210, which is the vertical reference datum. Accordingly, the waveguides 132 are positioned at a known location on the y-axis with respect to the surface 211 of the substrate 210.

As described above with respect to FIGS. 1-4, the connector body 220 includes a connector engagement feature 123 that is configured as a rib portion 123, and an upper surface 236 of the includes a chip engagement feature 233 configured as a groove 233. The rib portion 123 is disposed within the groove 233 when the connector body 220 is secured to the substrate 210. The cooperation of the rib portion 123 and the groove 223 provides horizontal axis (i.e., x-axis) control. It should be understood that other chip and connector engagement features may be utilized, such as the "sphere-in-socket and groove" arraignment illustrated in FIGS. 5-7.

Accordingly, vertical axis (i.e., y-axis) control is provided by the physical contact of the electrical coupling surface 234 with surface 211 of the substrate (i.e., the vertical reference datum), and horizontal axis (i.e., x-axis) control is provided by the rib portion 123 of the connector body 220 and the groove 233 of the photonic silicon chip 230.

It should now be understood that embodiments described herein are directed to optical ports that enable passive alignment with mated optical connectors. Various reference datum surfaces are provided for vertical axis control, as well as various mechanical features for horizontal axis control. The optical ports described herein set the waveguides of the photonic silicon chip at a known position with respect to alignment features of the connector body. The optical ports described herein do not require expensive active alignment systems to connect an optical connector to the optical port.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An optical port comprising:
    a substrate comprising a surface;
    a photonic silicon chip secured to the substrate, the photonic silicon chip comprising:
        an electrical coupling surface, an upper surface and an optical coupling surface, wherein the optical coupling surface is positioned between the electrical coupling surface and the upper surface;
        at least one optical waveguide terminating at the optical coupling surface; and
        a chip engagement feature disposed on the upper surface;
    a connector body secured to the substrate, the connector body comprising:
        a mounting surface; and
        a connector engagement feature at the mounting surface, wherein the connector engagement feature mates with the chip engagement feature of the photonic silicon chip; and
    a plurality of spacer elements disposed between the electrical coupling surface of the photonic silicon chip and the surface of the substrate.

2. The optical port of claim 1, wherein:
    the substrate comprises a first trench and a second trench within the surface;
    the connector body comprises a first leg portion and a second leg portion;
    the first leg portion is disposed in the first trench;
    the second leg portion is disposed within the second trench; and
    the first leg portion and the second leg portion are secured to the substrate within the first trench and the second trench, respectively, by an adhesive.

3. The optical port of claim 2, wherein the connector body further comprises a notch positioned between the first leg portion and the second leg portion.

4. The optical port of claim 2, wherein the connector body further comprises a mechanical coupling surface intersecting the mounting surface, a first alignment feature comprising a first alignment bore at the mechanical coupling surface, and a second alignment feature comprising a second alignment bore at the mechanical coupling surface.

5. The optical port of claim 1, wherein:
    the chip engagement feature is a groove within the upper surface of the photonic silicon chip;
    the connector engagement feature is a rib portion at the mounting surface; and
    the rib portion of the connector body is disposed within the groove of the photonic silicon chip.

6. The optical port of claim 1, wherein:
    the chip engagement feature comprises a first socket and a second socket within the upper surface of the photonic silicon chip, a first sphere within the first socket, and a second sphere within the second socket;
    the connector engagement feature comprises a groove within the mounting surface of the connector body; and
    the first sphere and the second sphere are disposed within the groove of the connector body.

7. The optical port of claim 1, wherein each spacer element of the plurality of spacer elements comprises an optical fiber disposed between a pair of gripper elements.

8. The optical port of claim 7, wherein the pair of gripper elements is fabricated from a polymer material.

9. The optical port of claim 7, wherein the photonic silicon chip is electrically coupled to the substrate by a ball grid array, and each spacer element is disposed between adjacent solder balls of the ball grid array.

10. The optical port of claim 9, wherein the plurality of spacer elements controls a height of the solder balls of the ball grid array.

11. The optical port of claim 1, wherein the photonic silicon chip comprises at least one optical source optically coupled to the at least one optical waveguide.

12. The optical port of claim 1, further comprising a circuit board, wherein the substrate is electrically coupled to the circuit board by a ball grid array.

13. The optical port of claim 1, wherein the connector body comprises a notch within the mounting surface, and the photonic silicon chip is disposed within a recess defined by the notch of the connector body and the surface of the substrate.

* * * * *